United States Patent
Shatsky et al.

(10) Patent No.: US 9,351,109 B2
(45) Date of Patent: *May 24, 2016

(54) METHOD, DEVICE AND SYSTEM FOR ENHANCING LOCATION INFORMATION

(71) Applicant: Blackberry Limited, Waterloo (CA)

(72) Inventors: Alexander Shatsky, Vaughan (CA); Gaelle Christine Martin-Cocher, Toronto (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,375

(22) Filed: Sep. 5, 2014

(65) Prior Publication Data

US 2014/0378162 A1    Dec. 25, 2014

Related U.S. Application Data

(63) Continuation of application No. 12/897,248, filed on Oct. 4, 2010, now Pat. No. 8,862,146.

(51) Int. Cl.
*H04W 24/00* (2009.01)
*H04W 4/02* (2009.01)
*G01S 19/48* (2010.01)
*H04W 4/04* (2009.01)
*H04W 4/00* (2009.01)

(52) U.S. Cl.
CPC .................. *H04W 4/02* (2013.01); *G01S 19/48* (2013.01); *H04W 4/04* (2013.01); *H04W 4/008* (2013.01)

(58) Field of Classification Search
CPC ....... H04W 4/02; H04W 4/023; H04W 4/025; H04W 4/028; H04W 64/00; H04W 64/003; H04W 4/22; H04W 8/22; H04W 76/007
USPC ......... 455/404, 1, 404.2, 414.1, 456.1, 456.2, 455/456.3, 456.4, 456.5, 3.02, 3.04; 705/5, 705/7, 14.66, 14.69, 14.52, 14.53, 14.58; 709/202, 203, 204
See application file for complete search history.

(56) References Cited

U.S. PATENT DOCUMENTS

| | | |
|---|---|---|
| 7,218,938 B1 | 5/2007 | Lau et al. |
| 7,221,947 B2 | 5/2007 | Casey |
| 7,515,917 B2 | 4/2009 | Casey |

(Continued)

OTHER PUBLICATIONS

Brockett, Dan, Location Sound: The Basics and Beyond, http://www.kenstone.net.fcp_homepage/location_sound.html, Oct. 21, 2002 (accessed Sep. 13, 2010).

(Continued)

*Primary Examiner* — Jean Gelin
(74) *Attorney, Agent, or Firm* — Perry + Currier, Inc.

(57) ABSTRACT

A method, system and apparatus for obtaining enhanced location information for a mobile device. The mobile device is configured to allow a determination of its location, for example via GPS. Location data for the mobile device, exemplarily obtained via GPS, may be further specified using context information for the mobile device. Additional data is obtained and processed to obtain context information for the mobile device. Enhanced location information is determined for the mobile device at least in part based on processing the location data in association with the context information. Additional data may comprise, for example, ambient noise, speech, images or text.

22 Claims, 4 Drawing Sheets

(56) References Cited

U.S. PATENT DOCUMENTS

| | | |
|---|---|---|
| 7,532,112 B2 | 5/2009 | Teasley |
| 7,966,306 B2 | 6/2011 | Strandell et al. |
| 8,099,112 B2 | 1/2012 | Krishnamurthi et al. |
| 8,437,773 B2 | 5/2013 | Sridhara et al. |
| 2003/0148775 A1 | 8/2003 | Spriestersbach et al. |
| 2004/0189517 A1 | 9/2004 | Pande et al. |
| 2005/0107953 A1 | 5/2005 | Sugla |
| 2008/0032666 A1 | 2/2008 | Hughes et al. |
| 2008/0045138 A1 | 2/2008 | Milic-Frayling et al. |
| 2008/0248801 A1 | 10/2008 | Fletcher et al. |
| 2008/0288355 A1 | 11/2008 | Rosen |
| 2009/0003281 A1 | 1/2009 | Panabaker |
| 2009/0156229 A1 | 6/2009 | Hein et al. |
| 2010/0082357 A1 | 4/2010 | Follmann et al. |
| 2010/0094878 A1 | 4/2010 | Soroca et al. |
| 2011/0126119 A1 | 5/2011 | Young et al. |
| 2012/0042036 A1 | 2/2012 | Lau et al. |

OTHER PUBLICATIONS

Dalton, Ben C., et al., "Audio-Based Self-Localization for Ubiquitous Sensor Networks," Audio Engineering Society Paper 6345, Audio Engineering Society Convention 118, Barcelona, May 2005.

Kirk, Robin, et al., "A Location-aware, Service-based Audio System," IEEE 2005 (accessed Sep. 13, 2010) http://jan.newmarch.name/publications/location_audio_ccnc05.pdf.

Scott, James, et al., "Audio Location: Accurate Low-Cost Location Sensing," Pervasive 2005, Spring, Berlin, 2005 (accessed Sep. 13, 2010) http://research.microsoft.com/en-us/um/people/jws/pubfiles/audiolocation-pervasive2005.pdf.

Welbourne, Evan, et al., "Mobile Context Inference Using Low-Cost Sensors," Proceedings of the International Workshop on Location- and Context-Awareness (LoCA). May 2005.

METHOD, DEVICE AND SYSTEM FOR ENHANCING LOCATION INFORMATION

CROSS-REFERENCE TO RELATED APPLICATIONS

This application is a continuation application of U.S. patent application Ser. No. 12/897,248 filed on Oct. 4, 2010. The forgoing application is incorporated by reference herein in its entirety.

TECHNICAL FIELD

The present disclosure relates generally to mobile electronic devices and, in particular, to techniques for obtaining location information for mobile devices.

BACKGROUND

Mobile electronic devices such as cellular telephones, handheld PDAs, and the like, have been developed for a wide variety of purposes. There are many uses for determining the exact location of a mobile device, for example to provide location based services or navigation instructions. Some of these devices are configured to allow a determination of their location. Various methods for determining location of mobile devices providing differing levels of accuracy have been developed. Examples of such location determination methods include GPS and cell triangulation. These methods however do not provide sufficient information to determine the location of the mobile device accurately or precisely in all situations. It is thus desirable to obtain more information regarding the location of a mobile device.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology generally provides a method, system and computer program product for obtaining enhanced location information for a mobile device.

According to an aspect of the present technology, there is provided a method of enhancing location information for a mobile device comprising: obtaining location data indicative of a location of said mobile device; obtaining additional data comprising context information for said mobile device; processing said additional data to obtain said context information; and determining enhanced location information for said mobile device, based at least in part on processing said location data in association with said context information.

According to another aspect of the present technology, there is provided a computer program product comprising code adapted to perform acts associated with the foregoing method when the code is loaded into memory and executed on a processor.

According to yet another aspect of the present technology, there is provided a system for enhancing location information for a mobile device comprising a location information module configured to obtain location data indicative of a location of said mobile device, obtain additional data comprising context information for said mobile device, the location information module further configured to process said additional data to obtain said context information and to determine enhanced location information for said mobile device, based at least in part on processing said location data in association with said context information.

Yet another aspect of the present technology is a mobile device for enhancing location information comprising a location information module configured to obtain location data indicative of a location of said mobile device, obtain additional data comprising context information for said mobile device, the location information module further configured to process said additional data to obtain said context information and to determine enhanced location information for said mobile device, based at least in part on processing said location data in association with said context information.

The details and particulars of these aspects of the technology will now be described below, by way of example, with reference to the attached drawings.

Figure 1:
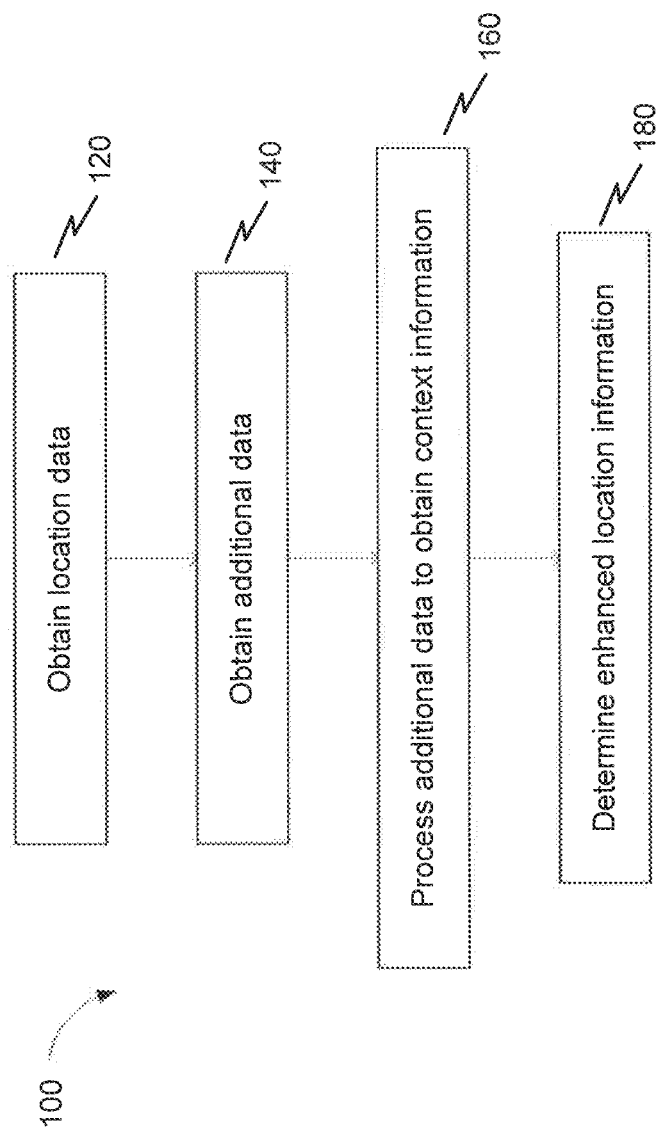
FIG. 1 is a flowchart presenting an exemplary method of obtaining location information for a mobile device in accordance with embodiments of the present technology.

FIG. 1 illustrates a method 100 for obtaining enhanced location information for a mobile device in accordance with some embodiments of the present technology. Referring to FIG. 1, the method 100 comprises obtaining 120 location data, obtaining 140 additional data, processing 160 the additional data to obtain context information and determining 180 enhanced location information based at least in part on processing the location data in association with the context information.

Exemplarily, location data is obtained from a GPS receiver and comprises geo-coordinates of the location of the mobile device. The additional data, exemplarily, comprises audio at the mobile device which is processed to determine context information for the mobile device. Exemplarily, the context information may be information indicating that the mobile device is in a car.

Referring to FIG. 1, the method comprises obtaining 120 location data and obtaining 140 additional data. Although the step of obtaining 120 location data is shown as occurring before obtaining 140 additional data, these steps may occur in either order or simultaneously. In some embodiments, one of these steps may remain in progress while the other has been completed.

The enhanced location information may be determined by one or more of the mobile device, a peer mobile device, a remote terminal and a remote server. Exemplarily, the enhanced location information may be used for location based services or navigation instructions.

Location Data

The method comprises obtaining location data. Location data, as used herein, comprises any type of location identifying data that will be readily known to a worker skilled in the art. Examples of location data include geographic location data such as geo-coordinate data (latitude/longitude) and geospatial data (latitude/longitude/altitude), cartographic position or map data such as city or street address, and the like.

Location data for a mobile device may be determined using a variety of device-based or network-based positioning methods known in the art for identifying location of a mobile device. A worker skilled in the art will readily understand that different methods can identify a location of a mobile device with differing levels of accuracy.

In some embodiments, location data may be determined using geosystem signals such as GPS, Galileo, GLONASS, Beidou and the like. For example, the mobile device may be associated with a GPS receiver for determining location based on the received GPS satellite signals.

In some embodiments, location data may be determined using network signals such as cellular carrier signals, WLAN signals, and the like. For example, location data for the mobile device may be determined using radiolocation, cell detection or triangulation techniques. As another example, the identity (and location) of the cell tower handling the device's communications can be used as a proxy for the location of the device. Examples of such network-based techniques for determining location data include but are not limited to cell identification, Enhanced Cell Identification, Time of Arrival (TOA), Angle of Arrival (AOA), Uplink Time Difference of Arrival (U-TDOA), Enhanced Observed Time Difference (E-OTD), and the like. In some embodiments, location data may be determined using signals received from a Wi-Fi access point.

In some embodiments, one or more methods may be used to determine location data for a mobile device. The method used to determine location data may be based at least in part on the availability of signals. In some embodiments, location data may be determined using either or both device-based and network-based methods. Examples of hybrid location determination systems using device-based and network-based positioning techniques include Wide Area Augmentation System (WAAS), Assisted-GPS (A-GPS) and the like.

The methods discussed above, provide information about the location of a mobile device, for example, a street address. However, in many situations the above-mentioned methods do not provide sufficient details regarding the location of a mobile device. For example, when the mobile device is located close to a building entrance, the above-noted methods may not be able to indicate whether the mobile device is inside or outside. As another example, these methods may not be able to distinguish whether the mobile device is on the street or in an underground station, whether the mobile device is in a moving vehicle or being held by a user jogging on the street.

Location data obtained for the mobile device may be specified further using additional data. Accordingly, additional data may be obtained to further enhance or supplement location information for a mobile device.

Exemplarily, location data may be further specified to locate the mobile device inside or outside a building, above or below ground or with respect to a particular floor or room in a building or house. As another example, location data for a mobile device may be further distinguished regarding whether it is on the street or in a moving vehicle and, in some embodiments, to determine the type of vehicle, for example, car, train, bicycle and the like.

Additional Data

The method comprises obtaining additional data comprising context information for the mobile device. Additional data is processed to obtain context information regarding the location of the mobile device.

Exemplarily, additional data may comprise audio data such as an audio stream of a phone conversation occurring on the mobile device. Additional data may comprise visual data such as images or video captured by the mobile device. Additional data may also comprise text messages or emails received or sent by the mobile device. In some embodiments, one or more types of additional data may be obtained.

Additional data may be stored in additional data files. A worker skilled in the art will readily understand that different types of additional data may be stored and transmitted in different types of additional data files. Each additional data file may comprise information regarding the additional data, such as the type of data, time and place of acquisition, and the like, which may be used for processing of the additional data.

Additional data may be obtained continuously, periodically or upon trigger or request. Additional data may be obtained in a push or pull configuration. For example, additional data comprising the content of a phone conversation occurring on the mobile device is obtained when it occurs (push) while additional data comprising ambient noise may be obtained by request (pull).

In some embodiments, additional data is received from a communicatively linked electronic device such as another mobile device or a sensor. Accordingly, in some embodiments, obtaining comprises receiving. For example, an additional data file comprising the recorded ambient noise may be received from the mobile device.

In some embodiments, additional data is acquired. For example, an image may be captured at the mobile device location. As another example, the audio of a phone conversation occurring on the mobile device is recorded. Acquiring as used herein, implies performing at least one action to capture, collect, measure, record, detect, create, analyses and the like. Accordingly, in some embodiments, obtaining comprises acquiring.

Additional data may be acquired continuously, periodically or upon trigger or request. In some embodiments, additional data is acquired by the mobile device in performance of its functions, for example, the audio data stream of a phone conversation. In some embodiments, the additional data is acquired by the mobile device specifically for determining enhanced location information, for example, ambient noise data may be recorded or analysed in order to determine location information.

The rate of receiving additional data may be the same or different from the rate of acquiring additional data. For example, additional data comprising all of the text messages sent or received by a mobile device (acquired) may be received when required for determining enhanced location information or the text messages may be received as they occur.

Audio Data

In some embodiments, the additional data comprises audio data. Audio data may comprise audio data received or sent by the mobile device as well as audio data that may have been otherwise obtained in the vicinity of the mobile device.

Audio data may be obtained using a sensor. For example, audio data comprising the audio stream of a phone call occurring on the mobile device may be obtained from a microphone associated with the mobile device. Audio data may also be obtained directly from the mobile device, for example, music being played on the mobile device.

Audio data may be acquired, stored and obtained in a variety of different suitable formats, as would be readily understood to a worker skilled in the art. Audio data may be acquired at a suitable sample rate and transmitted at a suitable bitrate which may be different for different sources or types of audio data. Audio data may be obtained in one format and converted to another format for storing, transmitting or processing. Audio data may be stored in a proprietary or standard digital audio format, as would be readily understood by a worker skilled in the art. Digital formats for audio files include uncompressed formats such as WAV, AIFF and the like. Digital formats for audio files include compressed formats such as MP3, MP4, wma, msv, gsm, vox, dct, aac, mop, amr, awb and the like. Selection of audio file formats may be based at least in part on the type of audio data, processing capability and available bandwidth capabilities, and may be mobile device dependent, for example.

In some embodiments of the present technology, audio data is processed by the device which performing the acquiring of the audio data. Accordingly, information for example, metadata, reflective of the outcome of the processing can be transmitted as to the desired mobile device for enabling the further refinement of location. For example, the information that is transmitted may be the results of the processing or analysis, namely that the device is "inside", "outside", "at starbucks" or the like.

In some embodiments, audio data comprises ambient noise. In some embodiments, audio data is processed to obtain the ambient noise. The ambient noise may be further processed to obtain context information about the environment surrounding the mobile device. Exemplarily, the ambient noise may be indicative of the mobile device being located in a car.

In some embodiments, audio data comprises voice data. Exemplarily, voice data may be obtained from phone calls, voice notes, and the like. In some embodiments, audio data is processed to obtain context information from the voice data. For example, speech recognition algorithms may be used to analyze the voice data and extract context keywords such as "café" or "library" or "D train". The context keywords may provide more information regarding the mobile device location.

Visual Data

In some embodiments, the additional data comprises visual data. Visual data may include one or more images indicative of the current location of the mobile device. An image may be a frame from a series of images captured periodically at a given frame rate or it may be a still image captured substantially immediately prior to processing. The images may be captured by an image-capturing device such as a still camera, video camera, infra-red camera or the like.

The image may be captured in a suitable image format as would be readily understood by a worker skilled in the art. Formats for capturing images may include raw image formats, Joint Photographic Experts Group File (JPEG) and the like for still and video images and interlaced and progressive scanning formats for digital video images.

The captured images, if not in a digital format, are converted to a digitized representation for processing. The digitized representation comprises pixels with image parameters such as resolution, pixel density, pixel bit depth, image size and magnification based in part on the image-capturing device.

The images may be stored in a proprietary or standard digital image format, as would be readily understood by a worker skilled in the art. Standard digital formats for still images include raster formats such as Joint Photographic Experts Group File Interchange Format (JPEG/JFIF), Tagged Image File Format (TIFF), raw image formats, Graphics Interchange Format (GIF), Tagged Image File Format (TIFF), Bitmap and the like, and vector formats, such as Computer Graphics Metafile (CGM), Scalable Vector Graphics (SVG), Encapsulated Postscript (EPS), Windows Metafile (WMF), Enhanced Metafile (EMF) and the like. Standard digital formats for moving images include H-261, Theora and Moving Picture Experts Group (MPEG) formats such as MPEG-1, MPEG-2, MPEG-4 and the like.

In some embodiments, processing of the images comprises converting the image from one format to another, for example to decompress the captured image, and to convert it to a format amenable to processing. In some embodiments, if the image corresponds to a still image contained in a compressed video file, processing of the image comprises reconstructing the still image from the compressed video file, as would be readily understood by a worker skilled in the art.

The images may also be associated with image parameters such as the location, orientation, tilt and zoom that may be used for processing of the image to obtain context information. The image parameters may be obtained from sensors operatively associated with the image-capturing device.

The captured image may be subjected to various pre-processing operations such as resampling, noise reduction, image stabilization and the like. For example, noise reduction and image stabilization may be necessary to improve the quality of the image before it can be subjected to more detailed processing. The pre-processing step may also include adjustments to image attributes such as color, balance, brightness, luminance, lighting, saturation and contrast.

Text Data

In some embodiments, additional data comprises text data. Text data may be derived from text received, sent, viewed or otherwise accessed by or on the mobile device. Text data may comprise email, SMS messages, pages, search terms, updates and entries created, received or viewed on the mobile device. For example, text data may include text input for searches performed on web databases, text on web-sites visited on the mobile device, or updates and entries on social networking venues such as Facebook™, Twitter™, Foursquare™ and the like. Text may include searches, updates or entries on electronic databases such as appointment books, calendars and the like that may or may not be on-line. Text data may also include text data created by conversion of speech data using speech recognition software.

As mentioned above, text data may be obtained from a wide variety of applications. Accordingly, the relevant text data may be obtained and stored in a wide variety of file formats suitable for those applications such as plain text, txt, doc, rtf, PDF, html and the like.

Data from Other Sensors

In some embodiments, additional data includes data obtained from other sensors such as motion sensors, position sensors, light sensors, humidity sensors and the like. Examples of sensors include thermometers, magnometers and other orientation sensors, gyroscopes, pedometers, accelerometers, altimeters, vibration sensors, radiation sensors and the like. Exemplarily, data obtained from a motion sensor such as an accelerometer or pedometer may be processed to determine context information for the mobile device such as whether the mobile device user is walking or in a car. As another example, data obtained from a light sensor may be used to determine whether the mobile device is located indoors or outdoors. As yet another example, data from position sensors such as altimeters may be used to determine the location of a mobile device inside a building.

In some embodiments, additional data comprises other data such as mobile device location history. Exemplarily, the location history for a mobile device may be processed to determine context information such as frequently visited or favourite locations for the mobile device. Other data may also comprise call history for the mobile device. For example, call history may be obtained and processed to determine that a recent phone call was made to a particular office located at a particular address which may be in the vicinity of the mobile device.

In some embodiments, additional data comprises other data such as appointments, reminders, notes or to-do list items saved in the mobile device. Additional data may comprise mobile device settings including but not limited to ringer setting and volume, notification settings, display settings such as brightness, contrast and the like.

Context Information and Processing of Additional Data

Context information, as used herein, comprises information that can be used to further specify location information for a mobile device. Context information may be information related to the mobile device or the mobile device user. For example, context information may comprise information regarding a state of the mobile device (such as moving or stationary), the environment surrounding the mobile device (such as quiet, hot or dark) or an activity that the mobile device user is engaged in (walking, driving, doing laundry, etc.)

As mentioned above, context information is used to obtain enhanced location information for the mobile device. Exemplarily, enhanced location information for a mobile device may be determined to be the laundry room in the basement of a particular house on a street if the location data indicates that the mobile device is located at a particular house on a street and the context information indicates that the mobile device user is engaged in doing laundry.

Context information may be obtained by processing the obtained additional data. For example, ambient noise data may be processed to determine whether the mobile device is located indoors or on the street. In some embodiments, one or more types of additional data are processed to determine context information.

Referring to FIG. 1, the method comprises processing 160 the additional data to obtain context information. In some embodiments, this step of processing is performed as the additional data is acquired. In some embodiments, this step of processing is performed after the acquisition of additional data has been completed. In some embodiments, this step of processing for obtaining context information is performed immediately before the processing for determining enhanced location information wherein the context information is used.

In some embodiments, current context information for the mobile device is obtained by processing substantially current additional data. In some embodiments, current context information is obtained by processing previously acquired and stored additional data. In some embodiments, additional data is processed to obtain context information for a future location. For example, current context information, such as whether the mobile device is indoors or outdoors, may be obtained by processing current ambient noise data acquired at the current location or by processing changes in ambient noise based on ambient noise data acquired over an extended period of time.

In some embodiments, context information may be obtained by processing audio data. The obtained audio data may comprise one or more components such as music, ambient sounds, conversations and the like. The audio data may be processed to identify, isolate, separate or remove one or more components. Different components of the audio data may be identified or processed using techniques that will be readily known to a worker skilled in the art. For example, specific components of the sound may be identified by their spectral characteristics. As another example, consistent sounds such as car engine sounds may be filtered out by using a previously detected "baseline" signal.

In some embodiments, the obtained audio data comprises ambient noise. In some embodiments, audio data is processed to obtain ambient noise. Ambient noise may be analyzed to obtain information about the surrounding environment. For example, ambient noise may be analyzed for its spectral characteristics and compared to known acoustic signatures such as that of a car or train. Accordingly, context information, exemplarily including information such as the mobile device being in a car, may be obtained by processing the ambient noise.

In some embodiments, the audio data is processed to determine an audio level or strength. The audio level may be determined for the overall audio signal detected by a sensor or optionally, certain components such as engine noise and other "background" sounds may be removed. In some embodiments, the audio level may be indicative of a level of a particular component of sound such as conversation, music or ambient noise.

In some embodiments, the audio data is processed to determine changes in audio level or strength. In some embodiments, context information for the mobile device may be obtained from the audio level or changes in audio level. For example, the ambient noise may be processed to determine the ambient noise level and a reduction in ambient noise level may be indicative of the mobile device having entered a building from a busy street.

In some embodiments, processing audio data to obtain context information comprises comparing audio level data to pre-determined thresholds in order to determine a state of audio level. For example, one or more audio level thresholds may be defined for different contexts or states such as "street", "car" and "silent" and context information for the mobile device may be obtained by comparing the audio level to one or more of the defined audio thresholds.

In some embodiments, the obtained audio data comprises speech data. In some embodiments, the audio data is processed to obtain speech data which is further processed to obtain context information. For example, the speech data may be obtained from an audio stream of a phone call made on the mobile device which may be processed to obtain at least partly the content of the conversation. Speech data may be analyzed using speech recognition techniques known in the art.

In some embodiments, the speech data is processed to recognize context keywords. Context keywords are words that may be related to a location (e.g. library), an activity (e.g. driving), a person and the like. As an example, if a mobile device user enters a café and mentions this fact in a conversation, the context keyword "café" may be detected by processing the audio data of the conversation thus providing context information (user is in a café) which may be used to further specify the location of the mobile device. In some embodiments, the identification of a context keyword can result in a refinement search being performed. For example, if the context keyword is "café", a subsequent search may be performed in order to identify the "cafes" in the area that is associated with the current location information. The information obtained from the refinement search can be used to further enhance the location information of the mobile device, for example by specifying the name of the "café" where the mobile device is located.

In some embodiments, the additional data comprises visual data. Visual data may comprise one or more images. The one or more images may be processed to obtain context information. The one or more images may be processed to recognize objects in the images in order to obtain context information. The recognized object may be a particular landmark building, a particular corner of a building, a traffic light, a tree or other object in the image. The recognized objects provide context information for the mobile device and may be used to further specify the location information for a mobile device. Exemplarily, an image taken by a mobile device containing a view of a building may be processed to recognize the building and to further provide the context information that the mobile device is located outside the building.

In some embodiments, recognizing objects in the input image comprises distinguishing or detecting objects such as streets, buildings, vehicles and the like. In some embodiments, recognizing objects further comprises identifying particular instances of more general objects. For example, the image is first processed to detect the portions of the image that represent the "building". Then, the one or more objects classified as "building" may be identified as a specific building by name, for example, "300 Oak Street", "Chrysler Building", etc.

Object and pattern recognition techniques and algorithms are well known in various fields related to computer vision such as facial detection, baggage scanning, etc. Typical object recognition techniques comprise segmenting the image into segments or sets of pixels that share some common visual characteristic using techniques such as contrast enhancement. The segmented regions or objects may be subjected to feature extraction. Typical features detected by feature extraction algorithms include edges, corners, blobs and ridges. Other properties such as colour, texture, shape and size of the objects may also be analyzed. Various rough and detailed classification steps may be successively applied to the objects to compare their feature sets with a set of standard patterns such as patterns for tree, car, street, etc. stored in a database and to determine the object classes. Other techniques for pattern and object recognition comprise determining key features as listed above on the mobile device and transmitting to the database only a compressed version of these features in the form of vectors, which can aid in limiting bandwidth consumption.

The objects detected in the image may be identified by comparing the image to maps or other images stored in a database. Such databases may be stored locally on a mobile device or on a remotely accessible server. Databases containing extensive automobile and pedestrian navigation maps are well-known and widely used in various navigation devices and applications. Some applications also provide images of locations in addition to map and terrain information. Exemplarily, the images or vectors may be stored in the database and the database entry may be linked to or tagged with reference to the location in the captured image or vectors. For example, a reference may indicate New York City, Times Square, north-west corner, latitude and longitude. Images of vectors in a database may also be stored with reference to image-capturing device parameters such as the location, orientation, tilt and magnification of the image-capturing device. For example, a reference may indicate: New York City, Times Square, south-west corner, latitude and longitude, facing N15W. Images or vectors in such databases may be used to compare images or vectors taken by the mobile device and thus to identify, for example, the particular corner of an intersection that a mobile device may be located in.

In some embodiments, additional data comprises text data. Text data may be processed to obtain context information for the mobile device. Text data may be processed to detect context keywords. As mentioned above, context keywords may be any words that can be correlated with a location of the mobile device, exemplarily related to an activity, state, person thing etc. Text data may be scanned for the existence of keywords using text analysis algorithms and techniques. Various kinds of text analysis software are readily available commercially and widely used for purposes such as content filtering of email messages and web content.

Exemplarily, the to-do list stored locally on the mobile device comprising an item "pick up dry-cleaning" may be scanned to obtain the context keywords "dry-cleaning" which may be useful context information for a mobile device located in a mall housing a dry-cleaner.

In some embodiments, additional data obtained from other sensors may be processed to obtain context information. For example, rate of motion data obtained from an accelerometer may be used to determine that the mobile device is on a train. As another example, light sensor data may be used to determine that the mobile device is located underground.

Different types of context information may be obtained from different types of additional data. For example, audio data comprising ambient noise may be useful for determining whether the mobile device is indoors or outdoors while speech data may be used for determining the location of a mobile device inside a building.

In some embodiments, context information is obtained by processing a plurality of additional data. For example, context information that a mobile device is on a train may be obtained by processing ambient noise data as well as accelerometer data. In some embodiments, context information may be obtained only by processing more than one additional data.

In some embodiments, context information may be obtained by processing more than one type of additional data in order to ensure accuracy of the context information. For example, context information derived from one type of additional data may be used to verify that derived from a different type of additional data.

In a situation where additional data of different types and from different sources may be available, a subset of additional data may be selected for processing. Alternately, the additional data may be processed in a particular order to obtain context information. Additional data may be selected or ranked in order based on one or more factors such as relevance for the desired context information, time of acquisition, accuracy of data, amount of data, ease of processing and processing capability, time available for processing, rate of change of location data, user preferences, privacy settings and the like. The order in which the additional data is processed may be based on this ranking.

In some embodiments, the validity of the additional data with respect to aiding in the enhancement of the "current" location of the mobile device, is determined. For example, if the additional data would result in a discrepancy between the context information obtained there from and the current location determined for the mobile device, this additional data can be ignored. Accordingly, the verification of the validity of the additional data can aid in the reduction of processing of this additional data. For example, when the additional data is a captured image, if a date stamp is not associated with the image, the image may be ignored as additional data.

Determining Enhanced Location Information

The method comprises determining enhanced location information for a mobile device based at least in part on processing the location data in association with said context information. Exemplarily, when the location data, for example, GPS-based location data, indicates that the mobile device is located in a mall, context information is used to further specify the mobile device location within the mall.

The context information may be obtained from a context keyword "dry-cleaning" in an item in the mobile device to-do list. The location data may be processed in conjunction with this context keyword to determine the existence of a dry-cleaner service within the mall and to further confirm the location of the mobile device in the dry-cleaning store inside the mall.

In some embodiments, the processing for determining enhanced location information comprises processing to identify a location related to the context information in the vicinity of the location defined by the location data. Accordingly, processing may comprise querying maps or other databases such as phone directory, transit schedules, etc.

In some embodiments, processing to determine enhanced location information further comprises processing location data history. Accordingly, current location information may be determined based on past location data. For example, if the context information is indicative of the user being at a café in a building which contains two different cafés, the café that is more frequently visited by the mobile device according to its location history may be given more weight or preference in processing to determine current location information. Accordingly, in some embodiments, the method further comprises storing the obtained location data to create a location data history.

Optionally, determining enhanced location data may be based at least in part on user validation. In some embodiments, the method further comprises obtaining user input to determine enhanced location data. For example, the user may be asked to verify that the determined location information, exemplarily displayed on a map, is correct. As another example, the user may be asked to choose between a list containing two or more locations. In this context, the user may be the actual user of the mobile device or the user of the device that is in communication with the actual user of the mobile device.

In some embodiments, the processing is performed by the mobile device. In some embodiments, the processing is performed by a peer mobile device. In some embodiments, the processing is performed at a remote server, exemplarily operated by a service and application provider. In some embodiments, the processing is performed by a combination of one or more of the mobile device, a peer mobile device and a remote server. The distribution of processing may be based on factors such as the computational capabilities of the respective processing modules associated with any of the mobile devices or remote server, communications capabilities between the mobile devices and the remote server and the availability of databases for maps, images and the like. One or more load balancing activities may be performed for the distribution of the processing burden, as would be readily understood by a worker skilled in the art.

Computer Program Product

Acts associated with the method described herein can be implemented as coded instructions in a computer program product. In other words, the computer program product is a computer-readable medium upon which software code is recorded to execute the method when the computer program product is loaded into memory and executed on the microprocessor of the mobile device.

Acts associated with the method described herein can be implemented as coded instructions in plural computer program products. For example, a first portion of the method may be performed using one mobile device, and a second portion of the method may be performed on another mobile device or a device such as a server, or the like. In this case, each computer program product is a computer-readable medium upon which software code is recorded to execute appropriate portions of the method when a computer program product is loaded into memory and executed on the microprocessor of a mobile device.

System

Embodiments of the present technology may be implemented on a system configured to obtain enhanced location information for a mobile device. The system comprises a location information module. The location information module may be configured to obtain location data indicative of a location of said mobile device, obtain additional data comprising context information for said mobile device, process the additional data to obtain the context information and determine enhanced location information at least in part based on processing the location data in association with the context information.

Figure 2:
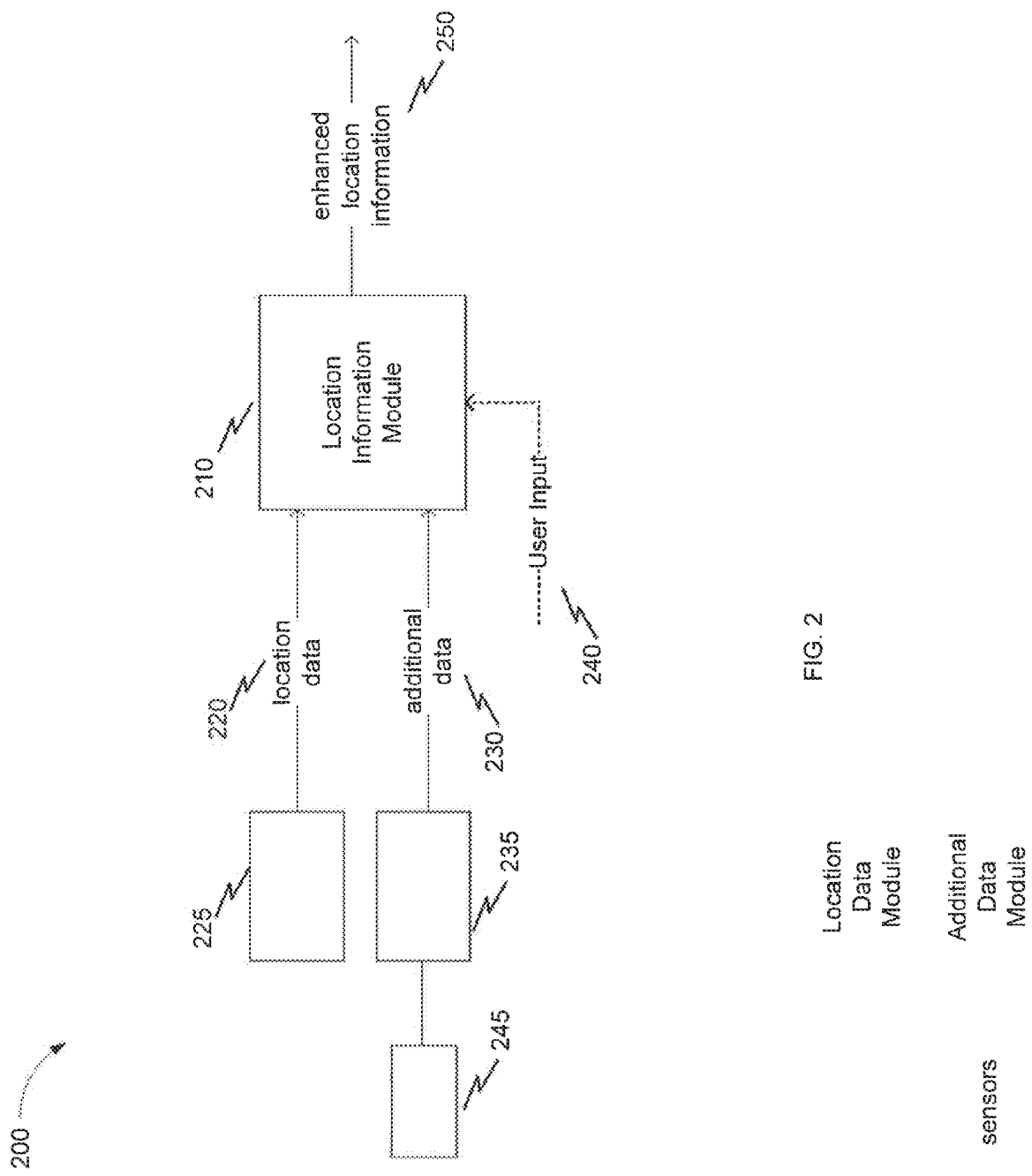
FIG. 2 illustrates a block diagram of an exemplary system for obtaining enhanced location information for a mobile device in accordance with embodiments of the present technology.

FIG. 2 is a schematic of an exemplary configuration of the system in accordance with embodiments of the present technology. The system 200 comprises a location information module 210 which obtains location data 220 from a communicatively linked location data module 225 and additional data 230 from one or more communicatively linked additional data modules 235. Optionally, user input 240 may also be obtained by the location information module 210. The location information module then processes the additional data 230 to obtain context information and determine enhanced location information 250 at least in part based on processing the location data 225 in association with the context information. The location information module 210 may optionally also be configured to request additional data from one or more additional data modules 235.

A processing module may be operatively coupled with the location information module, location data module and the additional data modules. The processing module may be configured to coordinate the functions of the various modules and to process different types of data using one or more processors. In some embodiments, the processing module is integrated with the location information module. In some embodiments, the processing module is the location information module. In some embodiments, the processing module comprises or is operatively associated with a memory module configured for storage of different types of data. Appropriate processing and memory modules would be readily understood by a worker skilled in the art.

The location data module is configured to allow a determination of a location of the mobile device. In some embodiments, the location data module 225 is integrated with the mobile device. In some embodiments, the location data module 225 is communicatively or operatively linked with the mobile device. In some embodiments, the location data module may be integrated or operatively coupled with the location information module.

In some embodiments, the location data module comprises a GPS receiver. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multinational Galileo system being developed by the European Union, in collaboration with China, India, Morocco, Saudi Arabia and South Korea, Russia's GLONASS system, India's proposed Navigational Satellite System (IRNSS), and Japan's proposed QZSS regional system. It should be appreciated that other techniques can be used, optionally or additionally, to determine the current location to a degree of accuracy commensurate with the technique used. For example, cell tower triangulation or radiolocation techniques, can be used to generate the current location for the device. Alternatively, the identity (and location) of the cell tower handling the device's communications can be used as a proxy for the location of the device. Satellite-based, regional, or network-based augmentation or improvement systems such as WAAS and A-GPS may also be utilized to aid in positioning. In some embodiments, location data may be determined using signals received from short range communication networks, for example near field communication (NFC), Bluetooth, Wi-Fi and the like.

An additional data module is configured to acquire additional data. Accordingly, one or more additional data modules may be integrated with or linked communicatively or operatively with the mobile device. Each additional data module may be configured to acquire additional data of a particular type or from a particular source. In some embodiments, an additional data module is also configured to process additional data.

In some embodiments, the system comprises one or more additional data modules 235. In some embodiments, an additional data module may be integrated or operatively coupled with the location information module.

In some embodiments, the mobile device comprises or is operatively associated with sensors such as microphones, orientation sensors, accelerometers, light sensors and the like. In some embodiments, one or more additional data modules comprise sensors. In some embodiments, an additional data module is operatively or communicatively associated with the sensors 245 such as microphones, orientation sensors, accelerometers, light sensors and the like. In some embodiments, the sensors are further configured to process signals detected by the sensors.

In some embodiments, the system comprises one or more additional data processing modules configured to process the additional data to obtain context information. An additional data processing module may be integrated or operatively coupled with the location information module.

In some embodiments, an additional data processing module may be configured to process all the additional data to obtain context information. In some embodiments, an additional data processing module may be configured to process additional data of a particular type or from a particular source. For example, there may be an audio processing module for processing audio data, a visual processing module for processing visual data and a text processing module for processing text data. In some embodiments, an additional data processing modules is linked operatively or communicatively with the respective additional data module. In some embodiments, an additional data processing module is integrated with the respective additional data module.

In some embodiments, the location information module is communicatively linked to one or more map and image databases 280 storing map and image information. In some embodiments, one or more map and image databases are stored locally in the location information module. In some embodiments, one or more map and image databases are communicatively linked to the location information module. In some embodiments, the map and image databases are located remotely at one or more map and image servers accessed via a network.

The processing required for the determination of enhanced location information may be performed by any combination of one or more of the following: the mobile device, by a peer mobile device, by a remote server managed exemplarily by a service and application provider, or by a remote terminal, exemplarily the base station. Information used in said processing may at least partly be stored on the mobile device, the peer mobile device, on a server of a service and application provider, or on a server of a data and content provider communicatively linked with the appropriate processing entities, such as described above, or a combination thereof. In some embodiments, the distribution of the processing burden is based on the amount of data available for processing and the available communication bandwidth for data transfer between the various processing entities.

Mobile Device

Embodiments of the present technology may be implemented on a mobile device. The mobile device may be a cellular telephone, satellite telephone, smartphone, PDA, laptop, net book, a tablet PC, a portable navigation system such as a handheld or vehicular GPS unit, or another device that can be configured to allow a determination of its location. Additional types of mobile devices would be readily known to a worker skilled in the art.

The mobile device may optionally have appropriate communication capabilities, such as voice communication capabilities, data communication capabilities, or a combination thereof. The mobile device may accordingly be capable of transmission and reception of data via a wireless communication medium such as radio.

Figure 3:
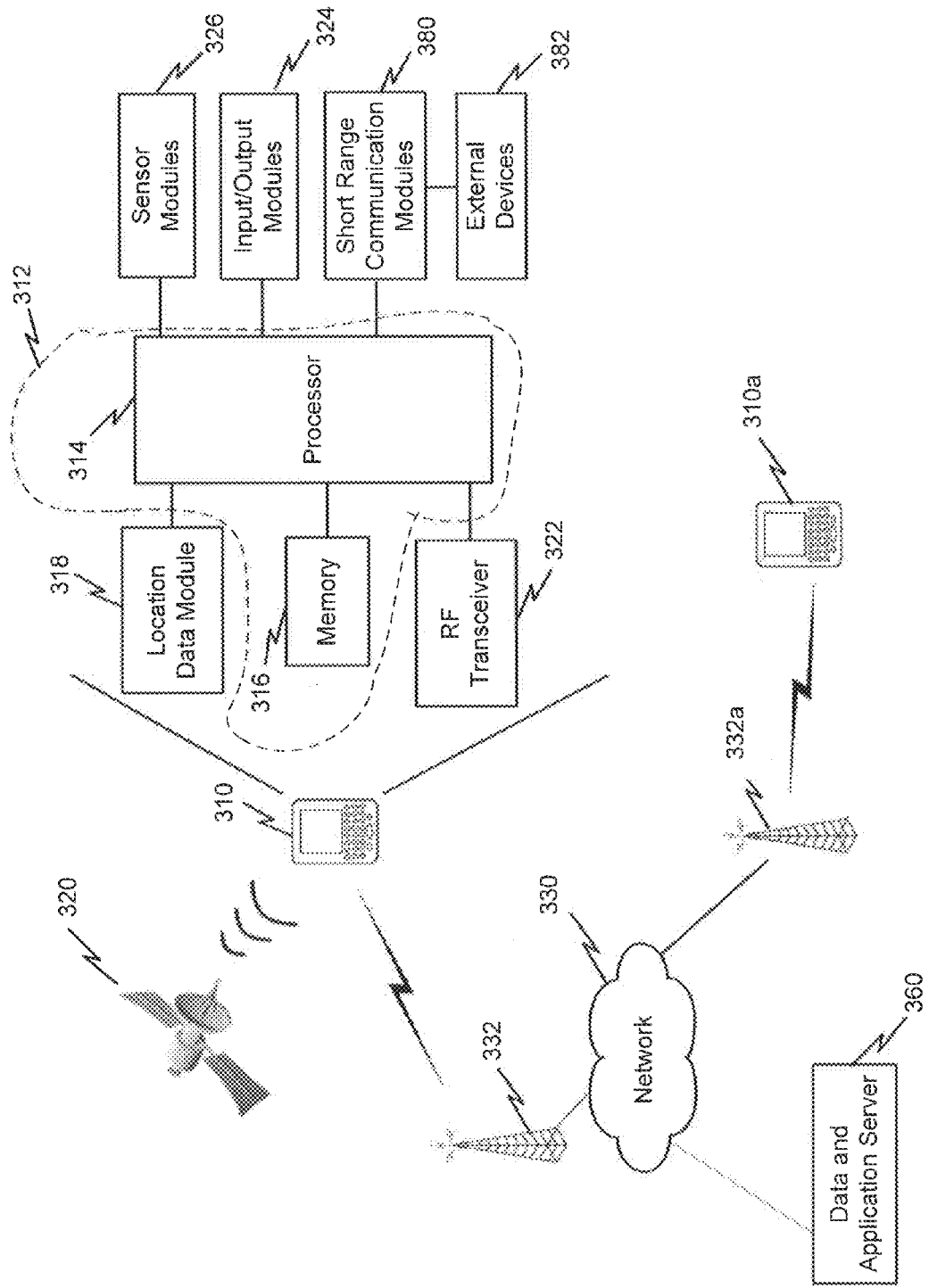
FIG. 3 is an illustration of an exemplary mobile device in accordance with embodiments of the present technology.

FIG. 3 shows a block diagram depicting certain main components of an exemplary mobile device 310 with wireless communications capability in accordance with embodiments of the present technology. It should be understood that this figure is intentionally simplified to show only certain components; the mobile device 310 may include other components beyond those shown in FIG. 3.

The mobile device 310 is operatively associated with a GPS system 320 allowing for determining its location. The mobile device 310 is linked to a cellular network 330 through a base-station 332, and thereby to one or more servers of a service and application provider, and to one or more servers of a data and content provider. Additional mobile devices 310a may be linked to the cellular network 330 using the same base station 332 or a separate base station 332a. The cellular network 330 thus serves for data transfer between peer mobile devices 310, 310a.

The mobile device 310 further comprises a location data module 318, which is configured to determine the location of the mobile device. In this embodiment, the location data module 318 includes a GPS receiver chipset for receiving GPS radio signals transmitted from the one or more orbiting GPS satellites 320. The GPS receiver chipset can be embedded within the device or externally connected, such as, for example, a Bluetooth™ GPS puck or dongle. Other systems for determining location may be used in place of GPS, as would be readily understood by a worker skilled in the art.

The device 310 comprises a processing module 312, which includes a microprocessor 314 (or simply a "processor") and operatively associated memory 316 (in the form of RAM or flash memory or both), to enable a variety of device functions and to execute an operating system for running software applications loaded on the device. The processing module 312 is configured to obtain location data indicative of a location of the mobile device, obtain additional data comprising context information for said mobile device, process the additional data to obtain context information and determine enhanced location information based at least in part on processing the location data in association with the context information.

The mobile device 310 includes a radiofrequency (RF) transceiver 322 for communicating wirelessly with the base station 332 of a wireless network 330. The base station 332 may be a cellular base station, wireless access point, or the like. The base station 332 may vary as the mobile device travels, for example, using well-known handoff processes in cellular networks. The RF transceiver 322 may optionally be alternatively or additionally used for communicating directly with a peer device such as a third party mobile device, for example as may occur in some ad-hoc networks. The RF transceiver enables access to a wireless communication channel for transmitting and receiving data. The RF transceiver 322 may further allow for a wireless voice channel for transmitting and receiving voice communications, for example concurrently with transmission and reception of data over the same or a separate logical or physical channel.

The mobile device 310 sends and receives communication signals via the RF transceiver 322. When communicating wirelessly with a base station 332 of a wireless network 330, the mobile device 310 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, High speed packet access (E-SPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, WiFi™ or WiMAX™ technologies, or other communication technologies and protocols as would readily be understood by a worker skilled in the art. In some embodiments, the mobile device 310 may be capable of operation using multiple protocols. The base station 332 may be part of a wireless network, such as a cellular network, local-area network, wide-area network, wireless hotspot network, or the like. The mobile device, base station, network components, and the like, may be configured for data communication, voice communication, or a combination thereof, possibly using additional components, configurations and procedures where appropriate, such as SIM cards, authorization and authentication procedures, handoff procedures, and the like, as would be readily understood by a worker skilled in the art.

Referring to FIG. 3, the mobile device 310 is linked to servers 360 which may include public or private servers. The servers may include map servers that provide map data to networked computing devices or mobile devices upon request, for example, in vector format or alternatively as bitmaps. In addition to providing the map data, the servers (e.g. the map servers) can also provide route instructions or route directions which are turn-by-turn instructions for each decision point along the route.

The mobile device comprises one or more input/output devices or user interfaces (UI's) 324. The mobile device 310 may include one or more of the following: a display (e.g. a small LCD screen), a thumbwheel and/or trackball, a keyboard, a touch screen, a keypad, a button, a speaker, a still camera and a video camera. The mobile device comprises one or more sensor modules 326 including but not limited to a microphone, an orientation sensor, an accelerometer, a light sensor etc.

The mobile device comprises short-range communication modules 380 for communication between the mobile device and other similarly enabled external devices 382. For example, short-range communication modules 380 may include a Bluetooth communication module for communicating with a windshield mounted camera or a car stereo display. These devices 382 may also be used exemplarily to obtain information about the current location or to display navigational information.

Implementations of the present technology will now be further explained with regard to the example scenarios. It should be expressly understood that these scenarios are only examples that are provided solely for the purposes of illustrating how the technology works in certain circumstances. Accordingly, these examples should not be construed as limiting any of the aspects of the technology already described above and claimed in the appended claims.

Figure 4:
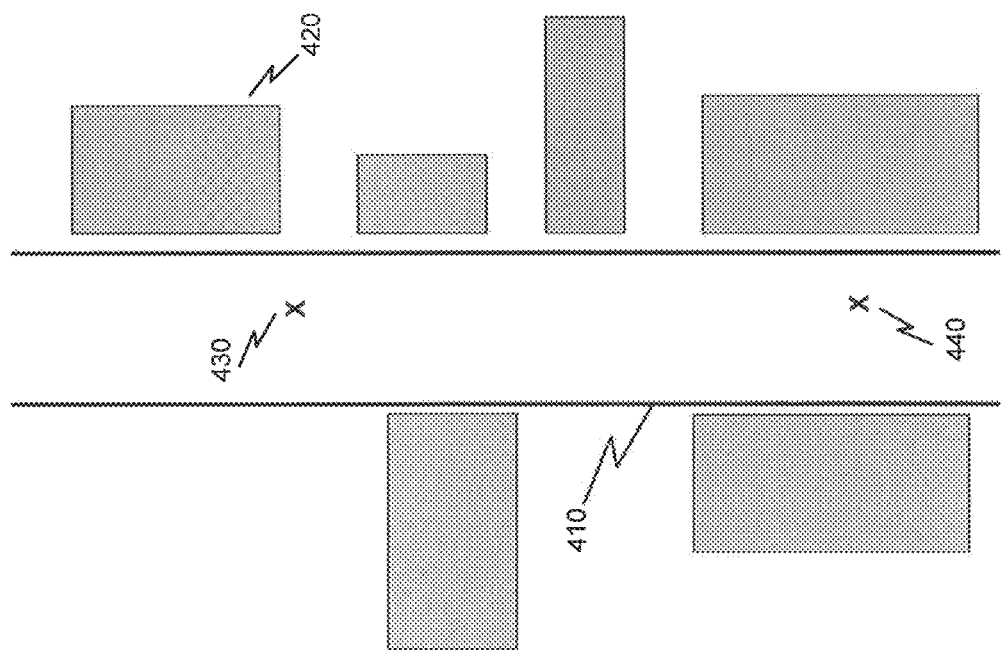
FIG. 4 is an example scenario illustrating the implementation of an exemplary method in accordance with embodiments of the present technology.

Consider first the example scenario depicted schematically in FIG. 4. A user is walking on a street 410 near a building 420. Location data for the mobile device is obtained using GPS signals. As the mobile device approaches a location 430 near this building 420, the GPS-based location data for the mobile phone indicates the street address as 300 Oak Street. However, the resolution of the location data based on the GPS signal is not accurate enough to determine whether the mobile device is located inside or outside the building. Therefore, additional information is obtained to further specify the location information for this mobile device. In this example scenario, additional data is obtained from the microphone integrated with the mobile device which is configured to periodically acquire audio data of the ambient noise. The audio data recorded by the microphone is processed to determine the ambient noise level in the vicinity of the mobile device. The current ambient noise level is compared to the ambient noise levels for audio acquired over the previous five minutes. This time period is selected based on the location history of the mobile device indicating that at a time five minutes ago the mobile device was on the same street at a different location 440. In this example scenario, the processing of the ambient noise levels indicates no change has occurred in the ambient noise levels over the previous five minutes, thus providing the context information that the mobile device is located on the street outside the building similar to its context five minutes earlier. Accordingly, enhanced location information can be obtained for this mobile device using the GPS based location data (street address) in association with the context information (on the street) indicating that mobile device is on the street outside the building 420 located at 300 Oak Street. Optionally, a prompt may be sent to the user of the mobile device requesting confirmation that the user is outside said building.

Figure 5:
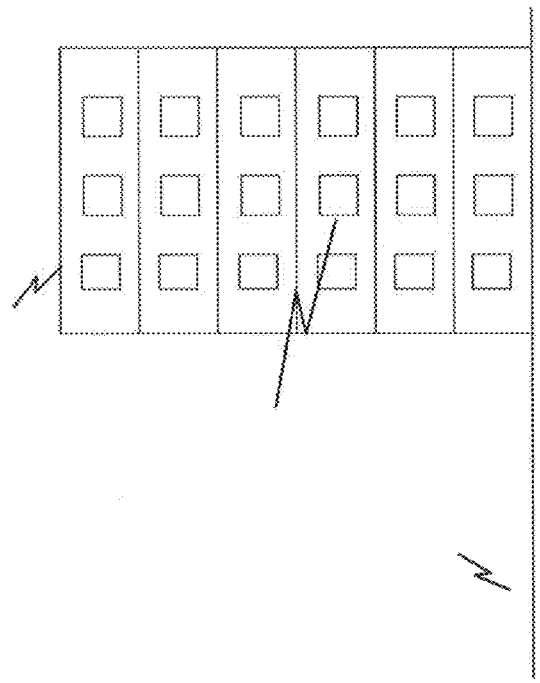
FIG. 5 is an example scenario illustrating the implementation of an exemplary method in accordance with embodiments of the present technology.

Consider a second example scenario depicted in FIG. 5 in which a user engaged in a phone conversation on a mobile device enters a building 510. In this scenario, the location of the device is being monitored by a peer mobile device (second mobile device). The GPS-based location data indicates the street address of the office building (300 Oak Street) as the mobile device location from the time that the user is at a point 520 near the office building. The user proceeds to an office located 525 on the third floor of the building 510. The location data determined by GPS, however, does not change during the time that the mobile device remains inside the building. In this example scenario, when the location data remains unchanged for a predefined period of time, the second mobile device requests additional data from the mobile device. Additional data obtained from the mobile device is processed to further specify the user's location after the user has entered the building. In this example scenario, the additional data obtained is audio data and context information is obtained by processing the content of the phone conversation using speech recognition algorithms. The processing detects the context keywords "doctor" and "prescription" indicating the context information that the user may be involved in an activity related to a doctor. This context information is further verified by performing a scan of the user's calendar (also obtained upon request) for context information from appointments saved therein. The user's calendar indicates an appointment with Dr. Jackson at 10:00 am. Enhanced location information for the mobile device is obtained by searching directory information for Dr. Jackson in the vicinity of the street address derived from the GPS-based location data. The result of the directory information search confirms that Dr. Jackson has an office on the third floor of said building thus determining enhanced location information for the mobile device.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A method of enhancing location information for a mobile device, the method comprising:
obtaining, at the mobile device, location data indicative of a location of said mobile device;
obtaining, utilizing one or more sensors of the mobile device, additional data, said additional data comprising context information, the context information comprising at least one of information regarding whether the mobile device is moving, information regarding a surrounding environment of the mobile device, and information related to an activity that a user of the mobile device is engaged in, said context information usable by at least one of the mobile device and a computing device coupled to the mobile device for further specifying the location of the mobile device;
processing said additional data to obtain said context information; and
determining enhanced location information for said mobile device, based at least in part on processing said location data in association with said context information, wherein the enhanced location information represents an improved location accuracy relative to the location information, and wherein processing said location data in association with said context information comprises further distinguishing the location data using the context information.

2. The method of claim 1 wherein the additional data comprises audio data.

3. The method of claim 1 wherein the additional data comprises visual data.

4. The method of claim 1 wherein the additional data comprises text data.

5. The method of claim 2 wherein the audio data comprises ambient noise and processing said audio data comprises obtaining context information from said ambient noise.

6. The method of claim 2 wherein processing said audio data comprises obtaining context information from an audio level.

7. The method of claim 2 wherein the audio data comprises speech data and processing said speech data comprises obtaining context keywords from said speech data.

8. The method of claim 1 wherein one or more types of additional data are processed to obtain context information.

9. The method of claim 8 wherein the one or more types of additional data are assigned a ranking and processed in an order at least in part based on said ranking, wherein said ranking is based on one or more of the following:
relevance for desired context information, age of data, time of acquisition, data accuracy, user preference, privacy settings, processing capability.

10. The method of claim 1 further comprising obtaining location history for the mobile device and wherein determining the location information is based at least in part on processing said location history.

11. The method of claim 1, further comprising obtaining user validation and wherein determining enhanced location information is based at least in part on said user validation.

12. The method of claim 1, wherein obtaining additional data comprises acquiring additional data.

13. The method of claim 1 wherein the processing of additional data to obtain context information is performed by one or more of the mobile device, a peer mobile device, a communicatively linked remote server or terminal.

14. The method of claim 1 wherein the processing to determine enhanced location information is performed by one or more of the mobile device, a peer mobile device, a communicatively linked remote server or terminal.

15. A system for comprising:
a mobile device configured to obtain location data indicative of a location of said mobile device, obtain additional data from one or more sensors of mobile device, said additional data comprising context information, the context information comprising at least one of information regarding whether the mobile device is moving, information regarding a surrounding environment of the mobile device, and information related to an activity that a user of the mobile device is engaged in—
a computing device configured to:
receive said additional data from the mobile device; and,
process said additional data to obtain said context information and to determine enhanced location information for said mobile device, based at least in part on processing said location data in association with said context information, wherein the enhanced location information represents an improved location accuracy relative to the location information, and wherein processing said location data in association with said context information comprises further distinguishing the location data using the context information.

16. The system of claim 15 wherein said mobile device further comprises processor configured to process audio data.

17. The system of claim 15 wherein said said processor is further a video configured to process visual data.

18. The system of claim 15 wherein said processor is further configured to process text data.

19. The system of claim 15 wherein the mobile device comprises a plurality of sensors, and wherein one or more of the plurality of sensors is an audio sensor configured to obtain audio data.

20. The system of claim 15 wherein the mobile device comprises a plurality of sensors, and wherein one or more of the plurality of sensors is a visual sensor configured to obtain visual data.

21. A mobile device configured for enhancing location information, the system comprising:
one or more sensors;
a processor operably coupled to the one or more sensors, the processor configured to:
obtain location data indicative of a location of said mobile device;
obtain, utilizing the one or more sensors, additional data, said additional data comprising context information, the context information comprising at least one of information regarding whether the mobile device is moving, information regarding a surrounding environment of the mobile device, and information related to an activity that a user of the mobile device is engaged in; and, process said additional data to obtain said context information and to determine enhanced location information for said mobile device, wherein determining enhanced location information is based at least in part on processing said location data in association with said context information, wherein the enhanced location information represents an improved location accuracy relative to the location information, and wherein processing said location data in association with said context information comprises further distinguishing the location data using the context information.

22. A non-transitory computer program product for obtaining enhanced location information for a mobile device, comprising code which, when loaded into memory and executed on a processor of a wireless communications device, is configured to:

obtain, at the mobile device, location data indicative of a location of said mobile device;

obtaining, utilizing one or more sensors of the mobile device, additional data, said additional data comprising context information, the context information comprising at least one of information regarding whether the mobile device is moving, information regarding a surrounding environment of the mobile device, and information related to an activity that a user of the mobile device is engaged in, said context information usable by at least one of the mobile device and a computing device coupled to the mobile device for further specifying the location of the mobile device;

process said additional data to obtain said context information; and determine enhanced location information for said mobile device, based at least in part on processing said location data in association with said context information, wherein the enhanced location information represents an improved location accuracy relative to the location information, and wherein processing said location data in association with said context information comprises further distinguishing the location data using the context information.

* * * * *